United States Patent
Mayer et al.

(10) Patent No.: US 11,848,796 B2
(45) Date of Patent: Dec. 19, 2023

(54) AGGREGATOR APPARATUS FOR STANDARDIZED ACCESS TO A PLURALITY OF NETWORK SEGMENTS OF A FIELD BUS SYSTEM

(71) Applicant: Endress+Hauser Process Solutions AG, Reinach (CH)

(72) Inventors: Michael Mayer, Oberwil (CH); Axel Pöschmann, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 326 days.

(21) Appl. No.: 17/282,825

(22) PCT Filed: Sep. 5, 2019

(86) PCT No.: PCT/EP2019/073746
§ 371 (c)(1),
(2) Date: Apr. 5, 2021

(87) PCT Pub. No.: WO2020/069815
PCT Pub. Date: Apr. 9, 2020

(65) Prior Publication Data
US 2021/0377068 A1     Dec. 2, 2021

(30) Foreign Application Priority Data
Oct. 4, 2018   (DE) .............. 10 2018 124 466.5

(51) Int. Cl.
*H04L 12/28*   (2006.01)
*H04L 12/40*   (2006.01)
(Continued)

(52) U.S. Cl.
CPC .............. *H04L 12/40* (2013.01); *H04L 45/02* (2013.01); *H04L 63/0209* (2013.01);
(Continued)

(58) Field of Classification Search
CPC .............. H04L 12/40; H04L 12/40078; H04L 12/40045; H04L 12/40091;
(Continued)

(56) References Cited

U.S. PATENT DOCUMENTS 5,103,391 A    4/1992  Barrett
8,868,732 B2*  10/2014 Smith .................. H04L 12/403
                                                709/224
(Continued)

FOREIGN PATENT DOCUMENTS

DE    102010063437 A1    6/2012
DE    102015108053 A1   11/2016
(Continued)

OTHER PUBLICATIONS

Suzuki, Keita, Ninagawa, Chuzo, Yoshida, Hiroki, Kondo, Seiji, Morikawa, Junji, Kanbe, Taiga and Aoki< Takao, Smart Grid ADR Aggregation Delay Model on Large-Scale Distributed Building HVAC Facilities, 2013 IEEE PES Innovative Smart Grid Technologies Europe (ISGT Europe), Oct. 6-9, Copenhagen, 978-1-4799-2984-9/13, 5 pp.

(Continued)

*Primary Examiner* — Frank Duong
(74) *Attorney, Agent, or Firm* — Kelly J. Smith; Endress+Hauser (USA) Holding, Inc.

(57) ABSTRACT

An aggregator is designed to form first data connections to field access devices. The field access devices are connected to different network segments of a field bus system. The aggregator forms a second data connection to a host computer. The aggregator receive first data traffic from the host computer via the second data connections and to forward the first data traffic, via the first data connections to a field access device of that network segment in which the particular field bus component, to which the first data traffic is directed, is (Continued)

situated. The aggregator is also designed to receive second data traffic from a field bus component in one of the network segments via at least one of the first data connections and to forward the second data traffic to at least one of the host computers via at least one of the second data connections.

17 Claims, 3 Drawing Sheets

(51) Int. Cl.
*H04L 45/02* (2022.01)
*H04L 9/40* (2022.01)

(52) U.S. Cl.
CPC .......... *H04L 63/0471* (2013.01); *H04L 63/08* (2013.01); *H04L 63/10* (2013.01)

(58) Field of Classification Search
CPC . H04L 12/40097; H04L 12/46; H04L 12/462; H04L 12/4625; H04L 12/66; H04L 45/02; H04L 45/04; H04L 45/10; H04L 63/0209; H04L 63/0471; H04L 63/08; H04L 63/10; H04L 2012/46; H04L 2012/5618; G05B 19/41855; G05B 2219/31348; Y02P 90/02
See application file for complete search history.

(56) References Cited

U.S. PATENT DOCUMENTS

| | | | |
|---|---|---|---|
| 10,554,724 B2* | 2/2020 | Lessmann | H04L 67/025 |
| 10,771,339 B2* | 9/2020 | Luber | H04L 12/4625 |
| 11,063,855 B2* | 7/2021 | Sotriffer | H04L 43/0847 |
| 11,336,751 B2* | 5/2022 | Lange | H04L 12/66 |
| 11,438,409 B2* | 9/2022 | Mayer | H04L 67/565 |
| 2005/0091394 A1 | 4/2005 | Breinlinger et al. | |
| 2006/0294579 A1 | 12/2006 | Khuti et al. | |
| 2007/0129820 A1 | 6/2007 | Glanzer et al. | |
| 2007/0155423 A1 | 7/2007 | Carmody et al. | |
| 2013/0124465 A1 | 5/2013 | Pingel et al. | |
| 2013/0212214 A1* | 8/2013 | Lawson | H04L 67/12 709/217 |
| 2017/0090467 A1* | 3/2017 | Cincea | H04L 12/40013 |

FOREIGN PATENT DOCUMENTS

| | | |
|---|---|---|
| DE | 102016125171 A1 | 6/2018 |
| EP | 2530912 A2 | 12/2012 |

OTHER PUBLICATIONS

Communication networks and systems for power utility automation—Part 80-3: Mapping to web protocols—Requirements and technical choices, IEC Technical Report Edition 1.0, Nov. 2015, IEC TR 61850-80-3:2015, ISBN 978-2-8322-29999-6, 92 pp.

* cited by examiner

AGGREGATOR APPARATUS FOR STANDARDIZED ACCESS TO A PLURALITY OF NETWORK SEGMENTS OF A FIELD BUS SYSTEM

CROSS-REFERENCE TO RELATED APPLICATIONS

The present application is related to and claims the priority benefit of German Patent Application No. 10 2018 124 466.5, filed on Oct. 4, 2018 and International Patent Application No. PCT/EP2019/073746 filed on Sep. 5, 2019, the entire contents of which are incorporated herein by reference.

TECHNICAL FIELD

The invention relates to an aggregator apparatus and a field bus system comprising a plurality of network segments and an aggregator apparatus.

BACKGROUND

Field devices serving to acquire and/or influence process variables are often used in automation technology. Examples of field devices of this type are fill-level measurement devices, mass flow meters, pressure and temperature measurement devices, etc., which, as sensors, detect the corresponding process variables for fill level, flow rate, pressure, and temperature.

Many field bus systems consist of a plurality of separate network segments which are managed separately from one another. Such a division increases the reliability of the overall system because in the event of a failure, only one network segment will be affected and the other network segments remain functional. The disadvantage of such field bus systems is that access authorizations for host computers for the various network segments must be set up separately.

SUMMARY

The object of the invention is to simplify access to the various network segments in a field bus system having a plurality of network segments.

This object is achieved by the features indicated in Claims 1 and 9.

Advantageous developments of the invention are indicated in the dependent claims.

An aggregator apparatus according to the embodiments of the present invention is designed to form a plurality of first data connections to a plurality of field access devices, wherein the field access devices are connected to a plurality of different network segments of a field bus system. The aggregator apparatus is designed to form at least one second data connection to at least one host computer. The aggregator apparatus is designed to receive first data traffic from the at least one host computer via at least one of the second data connections and to forward the first data traffic via at least one of the first data connections to a field access device of that network segment in which the particular field bus component to which the first data traffic is directed is situated. The aggregator apparatus is also designed to receive second data traffic from a field bus component in one of the network segments via at least one of the first data connections and to forward the second data traffic to at least one of the host computers via at least one of the second data connections.

The aggregator apparatus of the present invention provides centralized access to the network segments of a segmented field bus system. During operation, the aggregator apparatus is connected via first data connections to the field access devices and via at least one second data connection to a host computer. Data traffic directed by the host computer to a specific field bus component is routed through the aggregator apparatus to a field access device of that network segment in which the particular field bus component is situated. The field bus component may be a field device, a gateway device, or another field bus component. Conversely, the aggregator apparatus receives data traffic from a field bus component in a network segment and forwards this data traffic to at least one host computer. The host computer is provided with centralized access to the field access devices of the various network segments by the aggregator apparatus. The various network segments may be arranged at the same location but may also be arranged at a plurality of locations separated from one another.

The use of an upstream aggregator apparatus reduces administrative effort in a field bus system comprising a plurality of field bus segments. Previously, it was necessary to register the host computer on each field access device individually and to configure the firewall on each field access device such that access of the host computer to the particular network segment is permitted. Since many service technicians are granted access authorizations for their host computer for the various network segments of the field bus system, the administrative effort was considerable. In contrast, in the solution according to the invention, each host computer is registered only once centrally at the aggregator apparatus. For example, a firewall can be provided on the aggregator apparatus and then be configured such that a specific host computer has access to the aggregator apparatus and thus also to all field access devices of the network segments. Alternatively, a host computer or a user could also be granted access rights only for specific network segments and/or for specific field bus components and/or for specific functionalities of field bus components. Such access authorizations can be established, for example, by means of an authorization profile which is created for a specific host computer or a specific user. Since the particular access authorization has to be set up only once centrally on the aggregator apparatus, the administrative effort will be significantly lower than in previous solutions. The security standard is also improved because all configuration changes are, for example, made only at a central firewall and not, as before, at many decentralized firewalls, thus improving transparency.

For the service technician seeking to access a specific field bus component within the field bus system via his host computer, access to this field bus component is simplified as a result of the aggregator apparatus. The first data traffic received from the host computer is automatically routed through the aggregator apparatus to the field access device of that network segment in which the addressed field bus component is situated. The service technician therefore only has to select the desired field bus component via the field access software of his host computer. The service technician does not have to deal with the question as to the network segment in which the particular field bus component is situated, because the routing is carried out automatically by the aggregator apparatus. This is advantageous in particular in the case of extensive automation networks comprising a plurality of field devices, gateway devices, and other field bus components. Standardized access to all field bus components of the entire field bus system is thus possible from the host computer.

It is advantageous if the first data traffic is data traffic for the parametrization, configuration, and status monitoring of a field bus component. Parameters of the particular field bus component can be read out by the host computer and changed. The second data traffic preferably comprises at least one parameter value of the particular field bus component.

Routing information is preferably stored on the part of the aggregator apparatus. Such routing information indicates, for example, to which network segment a first data traffic directed to a specific field bus component has to be routed. This enables the aggregator apparatus to route the first data traffic received from the host computer automatically to that network segment in which the particular field bus component is situated.

A field bus system according to the embodiments of the invention comprises a plurality of network segments, wherein each network segment comprises at least one field access device, at least one field bus, and at least one field bus component. The at least one field access device is designed to allow access to field bus components in the particular network segment. In addition, the field bus system comprises an aggregator apparatus as described above, which is designed to form a plurality of first data connections to at least some of the field access devices in different network segments.

BRIEF DESCRIPTION OF THE DRAWINGS

In the following, the invention is outlined in more detail with the aid of exemplary embodiments depicted in the drawings. The figures show.

DETAILED DESCRIPTION

Within modern industrial plants, different functional areas are frequently covered by a plurality of separate network segments. This division of the field bus system into separate network segments takes place primarily for organizational reasons, for example in order to map the modular structure of the industrial plant or to clearly define responsibilities for different network segments. In addition, the reliability of the entire system is improved by the division into a plurality of separate network segments. For example, if a specific automation network fails, this failure will only affect a portion of the plant, while the remaining parts of the industrial plant remain functional.

Figure 1:
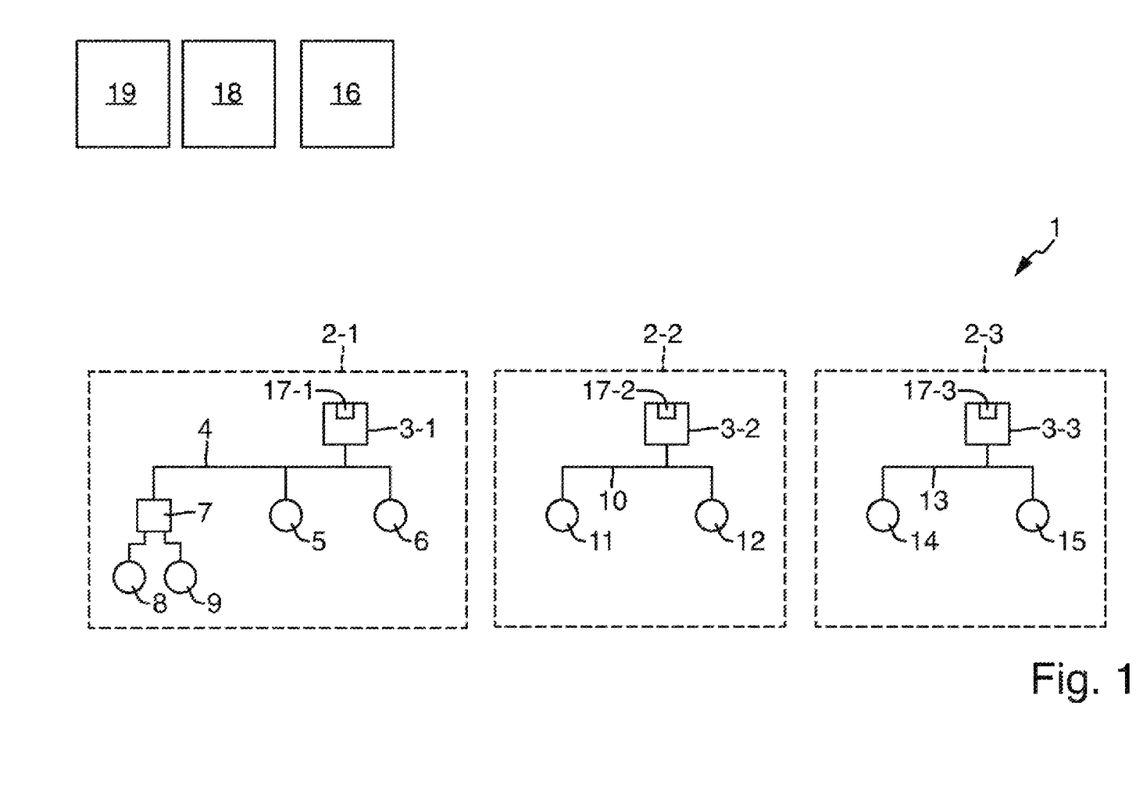
FIG. 1 shows a field bus system comprising a plurality of network segments, wherein the network segments comprise field access devices via which the field bus components in the individual network segments can be accessed.

FIG. 1 shows a field bus system 1 comprising three different network segments 2-1, 2-2, and 2-3. In the first network segment 2-1, a field access device 3-1 is provided, via which the field bus components of the first network segment 2-1 can be accessed from a host computer. The field access device 3-1 is connected to a field bus 4, wherein two field devices 5 and 6 and a gateway device 7 are also connected to the field bus 4. Connected to the gateway device 7 are two field devices 8 and 9.

The second network segment 2-2 comprises a field access device 3-2, via which the field bus components of the second network segment 2-2 can be accessed. The field access device 3-2 is connected to a field bus 10, wherein the two field devices 11 and 12 are also connected to the field bus 10.

The third network segment 2-3 comprises a field access device 3-3, via which the field bus components of the third network segment 2-3 can be accessed. The field access device 3-3 is connected to a field bus 13, to which the two field devices 14 and 15 are also connected.

In this respect, a separate field access device 3-1, 3-2, 3-3 is provided for each of the three network segments 2-1, 2-2, and 2-3. For parametrization, configuration, and status monitoring of the field bus components within a particular network segment 2-1, 2-2, 2-3, an external host computer 16 can access the particular field bus component within the network segment via the particular field access device 3-1, 3-2, 3-3.

Parametrization, configuration, and status monitoring of the field devices of a field bus network takes place by means of device access software installed on the host computer 16. The device access software can be, for example, a frame application according to one of the standards FDT, FDT2, FDI Device Packages, OPC Unified Architecture, etc., into which the required drivers for the various field bus components can be integrated. The various field bus components of the network segments 2-1, 2-2, 2-3 can be accessed via the device access software. The parameters of the various components of the network segments 2-1, 2-2, 2-3 can, in particular, be read out, presented, and modified from the device access software. In addition, the device access software allows status monitoring (condition monitoring) of the components of the network segments 2-1, 2-2, 2-3. The data exchange that is required for these tasks is normally handled via what is known as acyclical data traffic.

In order to be able to access the various field bus segments 2-1, 2-2, 2-3 from the host computer 16, it is however necessary to register the host computer 16 on each of the field access devices 3-1, 3-2, 3-3. In particular, it is necessary to configure the firewall 17-1, 17-2, 17-3 installed on the field access devices 3-1, 3-2, 3-3 respectively such that access of the host computer 16 to the particular network segment is permitted and not blocked by the firewall. However, in addition to the host computer 16, a plurality of further host computers 18, 19 are normally also used, wherein the host computers may, for example, be stationary computers but also laptops, mobile devices, tablets, or smart phones. Since each service technician normally has his own host computer for the parametrization, configuration, and status monitoring of the field devices, it is necessary to grant a plurality of different host computers 16, 18, 19 access to the network segments 2-1, 2-2, 2-3. In order to reliably prevent unauthorized access to the network segments, it is therefore necessary to keep the configuration of the particular firewall 17-1, 17-2, 17-3 up-to-date at all times and to adapt it to the host computers 16, 18, 19 currently in use. In this respect, the segmentation of an automation system into a plurality of network segments 2-1, 2-2, 2-3 results in a high administrative effort. In practice, this can, for example, lead to safety measures being completely deactivated or not implemented at all by the manufacturer.

Figure 2:
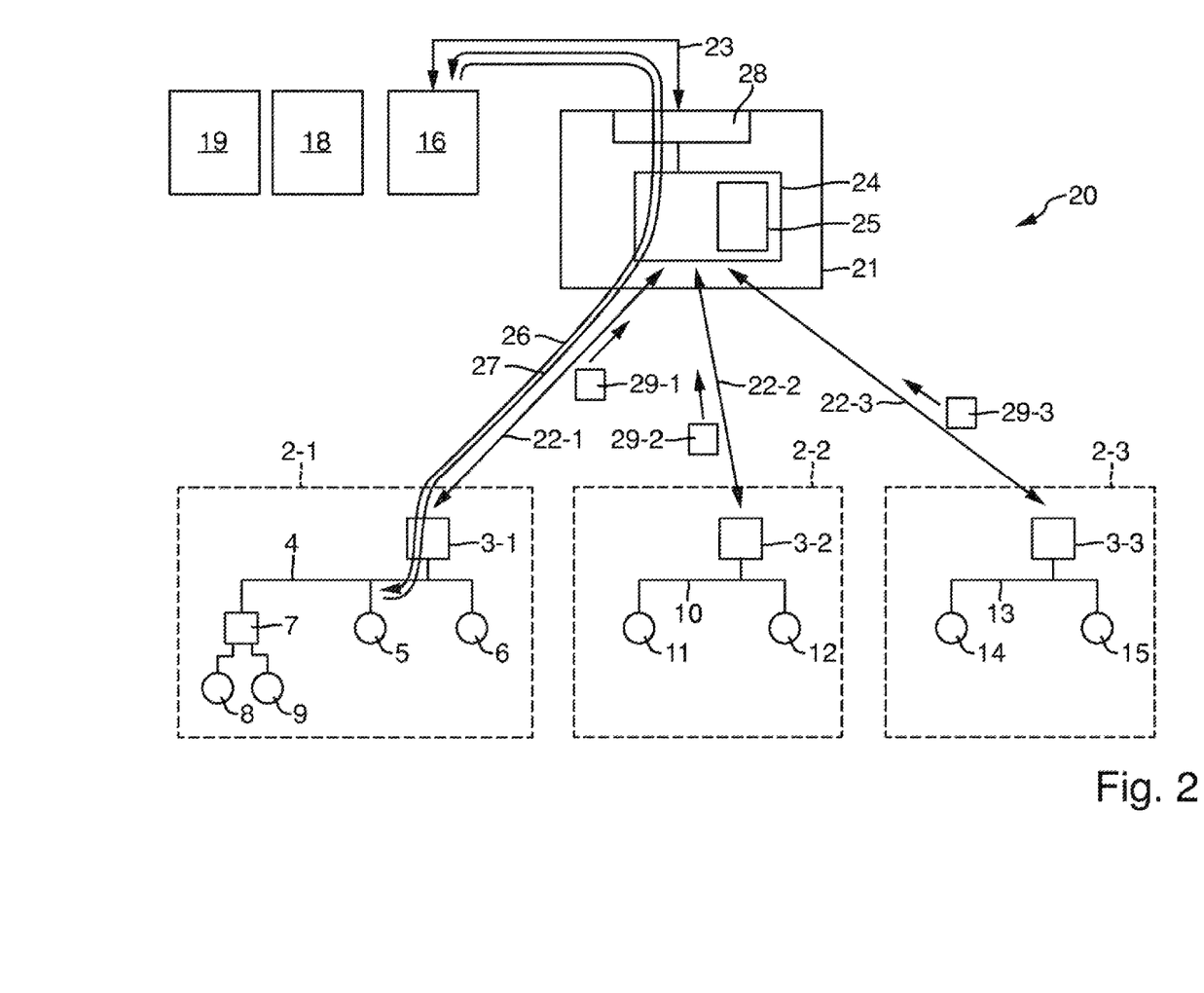
FIG. 2 shows a field bus system comprising a plurality of network segments, wherein access to the field access devices in the individual network segments takes place via an upstream aggregator box.

In the solution according to the invention, it is proposed to provide an aggregator box which is connected upstream of the field access devices 3-1, 3-2, 3-3 and which allows the host computers standardized access to the various network segments. FIG. 2 shows a field bus system 20 that comprises such an aggregator box 21. The aggregator box 21 is connected via a data connection 22-1 to the field access device 3-1 of the first network segment 2-1, via a data connection 22-2 to the field access device 3-2 of the second network segment 2-2, and via a data connection 22-3 to the field access device 3-3 of the third network segment 2-3. The data connections 22-1, 22-2, 22-3 between the aggregator box 21 and the field access devices 3-1, 3-2, 3-3 are preferably implemented as Ethernet connections. Each of the data connections 22-1 to 22-3 can be set up either as a wired data connection or as a wireless data connection. It is possible to set up some of the data connections as wired and others as wireless data connections.

In addition, one or more host computers 16, 18, 19 can be connected to the aggregator box 21. In the example shown in FIG. 2, the aggregator box 21 is connected to the host computer 16 via a data connection 23, wherein the data connection 23 may preferably be a wired or wireless Ethernet connection. The host computer 16 can be used to access field bus components in any of the three network segments 2-1, 2-2, 2-3 via the aggregator box 21. In this way, parametrization or configuration of the field devices, gateway devices, and other field bus components in the three network segments 2-1, 2-2, 2-3 can, for example, be carried out by the host computer 16. In addition, it is possible from the host computer 16 to query the device status and selected parameters of the field devices, gateway devices, and other field bus components in the three network segments 2-1, 2-2, 2-3 and to display them to the user.

In the following, it shall be discussed how a specific field bus component in one of the network segments 2-1, 2-2, 2-3 can be accessed from the host computer 16, for example in order to parametrize the field bus component. For this purpose, the host computer 16 sends data traffic addressed to the particular field bus component via the data connection 23 to the aggregator box 21. This data traffic is addressed, for example, to the field device 5 in the first network segment 2-1. A routing device 24 in which routing information 25 is kept available is provided on the part of the aggregator box 21. The routing information 25 indicates to which of the network segments 2-1, 2-2, 2-3 data traffic directed to a specific field bus component has to be forwarded. On the basis of this routing information 25, the routing device 24 of the aggregator box 21 can find out that the field device 5 is situated in the first network segment 2-1, so that the data traffic received from the host computer 16 has to be routed to the first network segment 2-1. In this respect, the routing device 24 transmits the data traffic via the data connection 22-1 to the field access device 3-1 and from there to the field device 5. This data transmission is illustrated in FIG. 2 by the arrow 26. The data connections 23 and 22-1 are preferably designed as Ethernet connections so that the data traffic can be transmitted in the form of Ethernet packets from the host computer 16 via the aggregator box 21 to the field access device 3-1.

In the opposite direction, data traffic can be transmitted from the field device 5 via the field access device 3-1 of the first network segment 2-1 and via the data connection 22-1 to the aggregator box 21. The aggregator box 21 receives this data traffic and forwards it via the data connection 23 to the host computer 16. This data traffic is illustrated in FIG. 2 by the arrow 27. The data are preferably transmitted again in the form of Ethernet data traffic from the field device 5 via the aggregator box 21 to the host computer 16. On the part of the host computer 16, the parameter values received from the field device 5 can be presented to the user by means of the device access software, for example.

In the event that a plurality of host computers are connected to the aggregator box 21, the aggregator box 21 preferably forwards the data traffic received from a field bus component only to that host computer or to those host computers for which the data traffic is intended. Normally, the data traffic received from the field bus component is a response to a request from a specific host computer. In this case, the aggregator box 21 would only forward the data traffic received from the field bus component to that host computer from which the request originated. The information required to be able to associate the response with the request is kept available on the part of the aggregator box 21. Alternatively, however, the data traffic received from the field access device could, for example, also relate to events that are relevant to one or more of the host computers. In this case, the aggregator box 21 would forward the received data traffic to all those host computers to which the particular event is relevant.

The provision of the aggregator box 21 has the advantage that the various host computers 16, 18, 19 need only be registered on the aggregator box 21. A firewall 28 is provided on the part of the aggregator box 21 and is designed to prevent unauthorized access to the automation network. This firewall 28 must therefore be configured to allow access to the various network segments 2-1, 2-2, 2-3 from any of the host computers 16, 18, 19. However, the access authorizations can also be restricted to specific prespecifiable network segments 2-1, 2-2, 2-3 or to specific prespecifiable field bus components or specific functionalities of field bus components. For this purpose, the aggregator box 21 can, for example, store authorization profiles for specific host computers 16, 18, 19 or for specific users, which authorization profiles individually establish the access authorizations for the particular host computer or user to specific network segments and/or to specific field bus components and/or to specific functionalities of the field bus components.

In this case, it is no longer necessary to register the host computers 16, 18, 19 on each of the field access devices 3-1, 3-2, 3-3. Since access to the automation network takes place centrally via the aggregator box 21, it is not necessary to carry out access control on the part of the field access devices 3-1, 3-2, 3-3. Since access is controlled centrally via the firewall 28 installed on the aggregator box 21, it is also not absolutely necessary to provide in each case a firewall on the field access devices 3-1, 3-2, 3-3, which means that the firewalls 17-1, 17-2, 17-3 shown in FIG. 1 can be omitted. Alternatively, however, the firewalls on the field access devices 3-1, 3-2, 3-3 could also be retained.

In addition, further additional functionalities can be provided in the interaction between the field access devices 3-1, 3-2, 3-3 and the aggregator box 21. For example, at least one of the field access devices 3-1, 3-2, 3-3 could be designed to indicate to the aggregator box 21 in accordance with a prespecified time schedule, preferably at regular time intervals, that the particular field access device is functioning and access to the particular network segment 2-1, 2-2, 2-3 is possible.

According to another embodiment, it could be provided that the field access devices 3-1, 3-2, 3-3 acquire data regarding device status and device health ("asset health") of the field bus components situated in the particular network segment 2-1, 2-2, 2-3 and transmit them to the aggregator box 21 in accordance with a prespecified time schedule, preferably at regular time intervals. This information regarding device status can then be displayed in an overview for all network segments 2-1, 2-2, 2-3 of the entire field bus system 20 to a user who is connected via his host computer 16 to the aggregator box 21. On the basis of this overall view of the field bus system 20, the user can then decide which parameters he wishes to query from the individual field devices, gateway devices, and other field bus components and possibly modify.

Before a data exchange between the aggregator box 21 and the field access devices 3-1, 3-2, 3-3 via the data connections 22-1, 22-2, 22-3 is possible, it is necessary for the aggregator box 21 and the field access devices 3-1, 3-2, 3-3 to mutually identify one another and exchange their device identifiers in order that the data traffic in question can be routed to the respective other communication participant. Various possibilities are described below as to how the aggregator box 21 and the field access devices 3-1, 3-2, 3-3 can mutually identify one another and exchange their device identifiers.

According to a first option, the device identifiers of the field access devices 3-1, 3-2, 3-3 are stored in advance in the aggregator box 21. For example, the device identifiers of the connected field access devices 3-1, 3-2, 3-3 can be input manually into the aggregator box 21. The aggregator box 21 can then identify itself to the field access devices 3-1, 3-2, 3-3 and transmit its own device identifier to the field access devices 3-1, 3-2, 3-3. In this way, the aggregator box 21 and the field access devices 3-1, 3-2, 3-3 can mutually inform one another about their device identifiers. In the case of Ethernet connections, the IP addresses of the field access devices 3-1, 3-2, 3-3 and of the aggregator box 21 are, for example, used as device identifiers.

According to a second option, provision can be made for the device identifier of the aggregator box 21 to be stored in each case by the field access devices 3-1, 3-2, 3-3. For example, it can be specified in each of the field access devices 3-1, 3-2, 3-3 that data exchange with a host computer is to be routed via an aggregator box 21 whose device identifier is stored in the field access devices 3-1, 3-2, 3-3. The device identifier of the aggregator box 21 can be input manually into the field access devices in advance, for example. The field access devices 3-1, 3-2, 3-3 can then identify themselves to the aggregator box 21 and in each case transmit their own device identifier to the aggregator box 21. In this way, the aggregator box 21 and the field access devices 3-1, 3-2, 3-3 can mutually inform one another about their device identifiers. In the case of Ethernet connections, the IP addresses of the field access devices 3-1, 3-2, 3-3 and of the aggregator box 21 are, for example, used as device identifiers.

According to a further option, it can be provided that the field access devices 3-1, 3-2, 3-3 send broadcast messages in accordance with a prespecified time schedule, preferably at regular intervals, wherein the device identifier of the particular field access device is indicated in the broadcast messages. The aggregator box 21 receives the broadcast messages of the field access devices 3-1, 3-2, 3-3 and retrieves from the broadcast messages the particular device identifiers of the field access devices 3-1, 3-2, 3-3 connected to the aggregator box 21. In the next step, the aggregator box 21 can identify itself to the field access devices 3-1, 3-2, 3-3 and communicate its own device identifier to the field access devices 3-1, 3-2, 3-3. Based on the broadcast messages of the field access devices 3-1, 3-2, 3-3, the aggregator box 21 and the field access devices 3-1, 3-2, 3-3 mutually inform one another about their device identifiers. In the case of Ethernet connections, the IP addresses of the field access devices 3-1, 3-2, 3-3 and of the aggregator box 21 are, for example, used as device identifiers.

According to a further option, the aggregator box 21 can be designed to send broadcast messages in accordance with a prespecified time schedule and preferably at regular intervals, wherein a device identifier of the aggregator box 21 can be indicated in the broadcast messages. These broadcast messages would then be received by the field access devices 3-1, 3-2, 3-3 so that the field access devices 3-1, 3-2, 3-3 are informed of the device identifier of the aggregator box 21. The field access devices 3-1, 3-2, 3-3 could thereupon identify themselves to the aggregator box 21 with the specification of their own device identifier. Based on the broadcast messages of the aggregator box 21, the aggregator box 21 and the field access devices 3-1, 3-2, 3-3 mutually inform one another about their device identifiers. In the case of Ethernet connections, the IP addresses of the field access devices 3-1, 3-2, 3-3 and of the aggregator box 21 are, for example, used as device identifiers.

According to a preferred embodiment of the invention, a setting element can be provided on the part of at least one of the field access devices 3-1, 3-2, 3-3 and can selectively be brought into a first setting or a second setting. If the setting element is in the first setting, which is hereinafter referred to as "true", this indicates that an aggregator box 21 is provided in the automation network and that data exchange with the at least one host computer will be routed via the aggregator box 21. If, on the other hand, the setting element is in the second setting, which is hereinafter referred to as "false", this means that no aggregator box is provided in the automation network so that data exchange will take place directly between the at least one host computer and the particular field access device.

The setting element can, for example, be a setting element implemented in hardware. For example, the setting element may be one of the following: a switching element, a changeover switch, a changeover element, a dual-in-line switch, a configuration element, a plug-in element, a plug, a jumper, a plug-in bridge, a short-circuiting plug.

When the setting element is in the first setting "true", the field access devices 3-1, 3-2, 3-3 are connected to the aggregator box 21 via data connections 22-1, 22-2, 22-3. For the data exchange, it is then necessary for the field access devices 3-1, 3-2, 3-3 and the aggregator box 21 to mutually exchange their device identifiers, i.e., for example, their IP addresses. One option for this purpose is that the device identifier of the aggregator box 21 is stored in advance in each of the field access devices 3-1, 3-2, 3-3 so that each field access device 3-1, 3-2, 3-3 can identify itself to the aggregator box 21.

Alternatively, it may be provided that a name of the aggregator box 21 to which the data traffic is then addressed is generated on the part of each of the field access devices 3-1, 3-2, 3-3 in accordance with a prespecified formation scheme. This name can be formed, for example, on the basis of the local domain in which the three field access devices 3-1, 3-2, 3-3 of the automation network are situated. When a field access device 3-1, 3-2, 3-3 registers in the particular local network, an IP address will be assigned to the field access device by the DHCP server of the network, wherein the local domain in which the field access device is registered is also communicated to the field access device within the framework of this DHCP assignment. Within a company, the local domain could, for example, be the particular company domain, e.g., a domain such as "examplecompany.com." Based on this local domain, a name of the aggregator box 21 to which the data traffic is then addressed can then be formed by adding a further name component. The name of the aggregator box is thus generated by means of a prespecified formation rule based on the local domain. For example, the name component "aggregator" as well as a separation point could be connected to the local domain "examplecompany.com" to form the name "aggregator.examplecompany.com." This name "aggregator.examplecompany.com" is then used by the particular field access device 3-1, 3-2, 3-3 to address the data traffic to the aggregator box 21. The name "aggregator.examplecompany.com" can be converted into the IP address of the aggregator box 21 by means of a DNS server during runtime. The advantage of this procedure is that a name suitable for addressing the aggregator box 21 can be generated by means of the prespecified formation rule on all field access devices 3-1, 3-2, 3-3 in a consistent manner based on the local domain. In this embodiment, it is not necessary to store the device identifier or the IP address of the aggregator box 21 in advance in the field access device 3-1, 3-2, 3-3.

In order that the aggregator box 21 can route the data traffic received from the host computer 16 to that field bus component for which the data traffic is intended, it must be known on the part of the routing device 24 which field devices, gateway devices, and other field bus components are present in the individual network segments 2-1, 2-2, 2-3. Routing information 25 is therefore stored in the routing device 24 and indicates, at least for a portion of the field bus components, the associated network segment in which the field bus component is situated. The routing information 25 preferably indicates for each field bus component the associated network segment in which the field bus component is situated. In addition, information on the topology within the network segments can optionally be kept available.

The information required by the aggregator box 21 is ascertained by the field access devices 3-1, 3-2, 3-3 of the network segments 2-1, 2-2, 2-3, for example, by the particular field access device carrying out a topology scan of the particular network segment. Such a topology scan could, for example, be automatically carried out by the particular field access device 3-1, 3-2, 3-3 at prespecified times or at prespecified time intervals. Alternatively, it would be possible to initiate such topology scans from the aggregator box 21. When carrying out a topology scan, the particular field access device ascertains the hierarchical structure of field bus segments, field devices, gateway devices, and other field bus components within the field bus network 2-1. The field access device 3-1 would determine, for example, that the field devices 5 and 6 and the gateway device 7 are connected to the field bus 4, wherein the two field devices 8 and 9 are connected to the gateway device 7. This topology information for the network segment 2-1 ascertained by the field access device 3-1 is subsequently transmitted, for example in the form of a file 29-1, from the field access device 3-1 to the aggregator box 21. A topology scan of the associated network segment 2-2 or 2-3 is also carried out by the field access devices 3-2 and 3-3 and the topology information thus ascertained is transmitted from the particular field access device 3-2, 3-3 to the aggregator box 21 in the form of files 29-2, 29-3. The topology information contained in files 29-1, 29-2, 29-3 serves as the basis for processing and providing the routing information 25. This routing information is used by the routing device 24 as the basis for routing the data traffic received from the aggregator box 21 to the correct network segment. The routing information 25 can thus contain topology information for the network segments 2-1, 2-2, 2-3, which is ascertained in the context of topology scans.

However, it is not absolutely necessary for the routing of the data traffic that the routing information 25 contains the complete topology information for the network segments 2-1, 2-2, 2-3. In this respect, it may be provided according to an alternatively preferred solution that the routing information 25 is assignment information which assigns the field bus components to the various network segments. This assignment information indicates at least for a portion of the field bus components to which network segment the particular field bus component is assigned. For example, the routing information 25 may indicate the associated network segment for each device identifier of a field bus component to which the data traffic may be directed. On this basis, the routing device 24 can decide to which network segment data traffic addressed to a particular field bus component has to be routed. The assignment information could, for example, also be structured such that it indicates for each network segment which field bus components are situated in the network segment. Such assignment information is sufficient to enable routing of the data traffic to the correct network segment.

The use of the aggregator box 21 thus results in the advantage that the data traffic received from the host computer 16 is automatically routed to the correct network segment and to the correct destination address. A user who wishes to access a specific field device via his host computer, for example a laptop, therefore does not have to deal with the question as to the network segment in which the particular field device is arranged.

Figure 3:
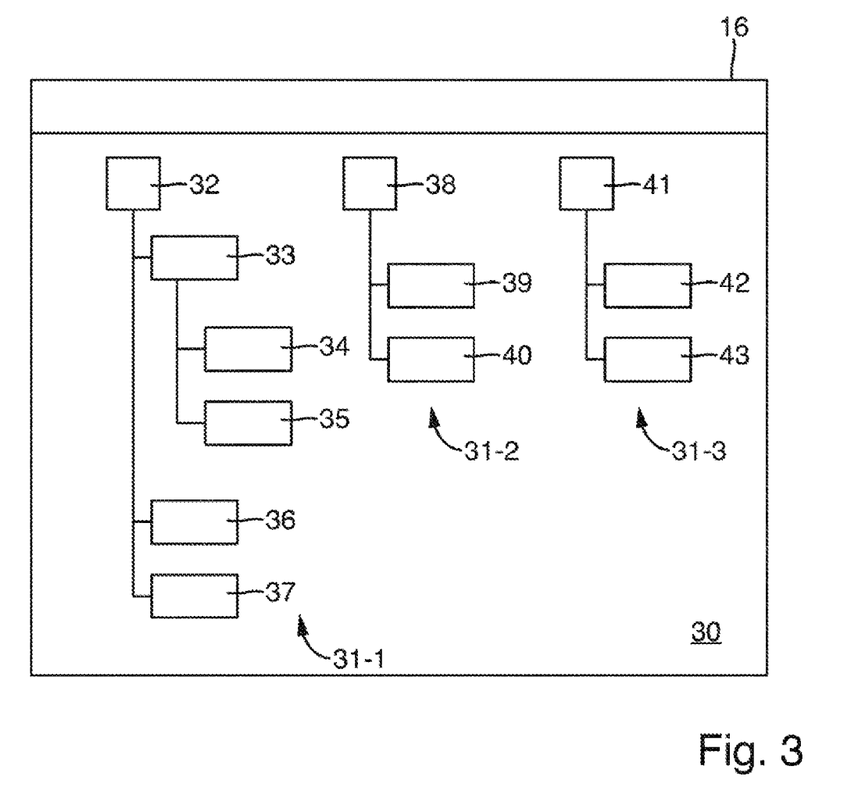
FIG. 3 shows a host computer on which device access software is installed, wherein the device access software provides a plurality of driver structures for accessing different network segments.

The host computer 16 with the device access software 30 installed thereon is schematically illustrated in FIG. 3. The information about the properties and parameters of the field devices, gateways, remote I/Os etc. required by the device access software 30 is normally made available by the manufacturers of the different devices in the form of device description files or device drivers. With the Profibus-DP, Profibus-PA, Fieldbus Foundation, and HART field bus protocols, device descriptions according to the DTM (Device Type Manager), DD (Device Description), EDD (Enhanced Device Description), and FDI Device Packages standards are used, for example.

In the FDT/DTM standard, the DTMs (Device Type Managers) are made available in the form of dynamically loadable libraries (DLLs) or in the form of executable files (executables). The various DTMs for the various components of the field bus network are integrated into a common FDT frame application, where FDT stands for "Field Device Tool". A common frame application is thereby made available into which the DTMs for various devices and from different manufacturers may be integrated. The FDT2 standard was introduced as the successor standard to FDT. In addition, the FDI Device Packages standard has been established as the successor standard to FDT and EDD, where FDI stands for "Field Device Integration". In addition to the Profibus, Fieldbus Foundation, and HART field bus protocols previously discussed, what are known as the Industrial Ethernet protocols, which include amongst others the EtherNet/IP, PROFINET, and EtherCAT field bus protocols, are relevant. In the EtherNet/IP field bus protocol, a device description file corresponding to the EDS (Electronic Data Sheet) standard is provided for describing both cyclical and acyclical data exchange. In addition, the OPC Unified Architecture standard of the OPC Foundation, OPC UA for short, is becoming increasingly important.

As can be seen in FIG. 3, an associated hierarchical driver structure 31-1, 31-2, 31-3 for each of the three network segments 2-1, 2-2, 2-3 is present in the device access software 30, said hierarchical driver structure reflecting the structure of the particular network segment. The first driver structure 31-1 for the first network segment 2-1 comprises a communication driver 32, a gateway driver 33, and device drivers 34 to 37. The second driver structure 31-2 comprises a communication driver 38 and two device drivers 39 and 40. The third driver structure 31-3 comprises the communication driver 41 and the device drivers 42 and 43. For example, if the user wants to access the field device 11 in the second network segment 2-2, data traffic is generated via the device driver 39 and the communication driver 38 and is routed via the aggregator box 21 to the field access device 3-2 of the second network segment 2-2 and subsequently forwarded to the field device 11. In the opposite direction, data traffic from the field device 11 passes via the network segment 2-2 and the aggregator box 21 to the communication driver 38 and from there to the device driver 39.

The invention claimed is:

1. An aggregator apparatus which is designed to form a plurality of first data connections to a plurality of field access devices, wherein the field access devices are connected to a plurality of different network segments of a field bus system,
wherein the aggregator apparatus is designed to form at least one second data connection to at least one host computer,
wherein the aggregator apparatus is designed to receive first data traffic from the at least one host computer via at least one of the second data connections and to forward the first data traffic via at least one of the first data connections to a field access device of that network segment in which the particular field bus component to which the first data traffic is directed is situated, and
to receive a second data traffic from a field bus component in one of the network segments via at least one of the first data connections and to forward the second data traffic to at least one of the host computers via at least one of the second data connections;
wherein the at least one host computer only registers once with the aggregator for authorized access to different network segments via different respective field access devices.

2. The aggregator apparatus of claim 1, wherein at least one of the following is true:
the aggregator apparatus is designed to provide standardized access to a field bus system comprising a plurality of network segments;
the first data traffic is data traffic for the parametrization, configuration, and status monitoring of a field bus component;
the second data traffic received from a field bus component in one of the network segments comprises at least one parameter value of the particular field bus component;
the aggregator apparatus is designed to selectively forward the second data traffic received from a field bus component in one of the network segments to the host computer or to the host computers for which the second data traffic is intended; and
the aggregator apparatus is implemented as an independent aggregator device or in the form of a software module executable on a computer.

3. The aggregator apparatus of claim 1, wherein at least one of the following is true:
the plurality of first data connections comprises at least one of the following: at least one wireless data connection, at least one wired data connection; and the at least one second data connection comprises at least one of the following: at least one wireless data connection, at least one wired data connection.

4. The aggregator apparatus of claim 1, wherein the aggregator is designed to forward the first data traffic on the basis of the field bus component indicated as the destination address of the first data traffic to a field access device of that network segment in which the particular field bus component is situated.

5. The aggregator apparatus of claim 4, wherein routing information which indicates to which network segment a first data traffic directed to a specific field bus component is to be routed is stored on the part of the aggregator apparatus.

6. The aggregator apparatus of claim 5, wherein at least one of the following is true:
the aggregator apparatus is designed to forward a first data traffic received from at least one of the host computers on the basis of the routing information to that network segment in which the field bus component to which the first data traffic is directed is situated;
the routing information is topology information specifying the topology of the network segments connected to the aggregator apparatus;
at least one of the field access devices is designed to ascertain topology information for the associated network segment by using a scan and to transmit the topology information to the aggregator apparatus;
at least one of the field access devices is designed to ascertain the field bus components present in the associated network segment using a scan;
at least one of the field access devices is designed to ascertain using a scan the field bus components present in the associated network segment and to transmit the scan results in the form of at least one file from the particular field access device to the aggregator apparatus;
the at least one field access device is designed to automatically carry out a scan of the associated network segment at prespecified time intervals; and
the aggregator apparatus is designed to initiate a scan on the part of the at least one field access device.

7. The aggregator apparatus of claim 5, wherein at least one of the following is true:
routing information is assignment information which assigns the field bus components to the various network segments; and
the routing information is assignment information which indicates in which network segment the particular field bus component is situated.

8. The aggregator apparatus of claim 1, wherein at least one of the following is true:
the aggregator apparatus is designed to authenticate the at least one host computer;
the aggregator apparatus is designed to authorize the at least one host computer;
the aggregator apparatus is designed to assign access authorizations to the at least one host computer for complete or partial access to specific network segments and/or specific field bus components and/or specific functionalities of field bus components;
the aggregator apparatus comprises a firewall, wherein the at least one host computer can be registered with the firewall of the host computer; and
the aggregator apparatus has an encryption and decryption unit for encrypting and decrypting the data traffic exchanged with the at least one host computer.

9. A field bus system, including:
a plurality of network segments, wherein each network segment comprises at least one field access device, at least one field bus, and at least one field bus component, wherein the at least one field access device is designed to allow access to field bus components in the particular network segment,
an aggregator apparatus which is designed to form a plurality of first data connections to at least some of the field access devices in different network segments;
wherein the aggregator apparatus is designed to form at least one second data connection to at least one host computer,
wherein the aggregator apparatus is designed to receive first data traffic from the at least one host computer via at least one of the second data connections and to forward the first data traffic via at least one of the first data connections to a field access device of that network segment in which the particular field bus component to which the first data traffic is directed is situated, and
to receive a second data traffic from a field bus component in one of the network segments via at least one of the first data connections and to forward the second data traffic to at least one of the host computers via at least one of the second data connections;
wherein the at least one host computer only registers once with the aggregator for authorized access to different network segments via different respective field access devices.

10. The field bus system of claim 9, wherein the field bus system is designed such that the aggregator apparatus and the field access devices connected thereto mutually inform one another about their particular device identifiers.

11. The field bus system of claim 9, wherein for identifying the field access devices connected to the aggregator apparatus, device identifiers of the field access devices connected to the aggregator apparatus are stored in the aggregator apparatus, wherein the aggregator apparatus is designed to identify itself to the field access devices connected to the aggregator apparatus.

12. The field bus system of claim 9, wherein at least one of the following true:
the plurality of first data connections are Ethernet connections;
the at least one second data connection is at least one Ethernet connection;
device identifiers of the field access devices are IP addresses of the field access devices; and
a device identifier of the aggregator apparatus is an IP address of the aggregator apparatus.

13. The field bus system of claim of claim 9, wherein at least one of the following:
at least one of the field access devices connected to the aggregator apparatus is designed to send broadcast messages in accordance with a prespecified time schedule, wherein the aggregator apparatus is designed to receive the broadcast messages from the field access devices connected to the aggregator apparatus and to identify the field access devices connected to the aggregator apparatus on the basis of the received broadcast messages;
at least one of the field access devices connected to the aggregator apparatus is designed to send broadcast messages in accordance with a prespecified time schedule, wherein the aggregator apparatus is designed to receive the broadcast messages from the field access devices connected to the aggregator apparatus and to identify the field access devices connected to the aggregator apparatus on the basis of the received broadcast messages, wherein the at least one field access device is designed to transmit a device identifier of the field access device in the broadcast message to the aggregator apparatus;
at least one of the field access devices connected to the aggregator apparatus is designed to send broadcast messages in accordance with a prespecified time schedule, wherein the aggregator apparatus is designed to receive the broadcast messages from the field access devices connected to the aggregator apparatus and to identify the field access devices connected to the aggregator apparatus on the basis of the received broadcast messages, wherein the aggregator apparatus is designed to identify itself to the field access devices upon receiving the broadcast messages.

14. The field bus system of claim 9, wherein at least one of the following is true:
the aggregator apparatus is designed to send broadcast messages in accordance with a prespecified time schedule, wherein the field access devices are designed to receive the broadcast messages from the aggregator apparatus and to identify the aggregator apparatus on the basis of the received broadcast messages;
the aggregator apparatus is designed to send broadcast messages in accordance with a prespecified time schedule, wherein the field access devices are designed to receive the broadcast messages from the aggregator apparatus and to identify the aggregator apparatus on the basis of the received broadcast message, wherein the aggregator apparatus is designed to transmit a device identifier of the aggregator apparatus in the broadcast message to the field access devices connected to the aggregator apparatus; and
the aggregator apparatus is designed to send broadcast messages in accordance with a prespecified time schedule, wherein the field access devices are designed to receive the broadcast messages from the aggregator apparatus and to identify the aggregator apparatus on the basis of the received broadcast message, wherein the field access devices are designed to identify themselves to the aggregator apparatus upon receiving a broadcast message.

15. The field bus system of claim 9, wherein at least one of the following is true:
a device identifier of the aggregator apparatus is stored in the field access device on the part of the field access devices, wherein the field access devices are designed to identify themselves to the aggregator apparatus to which they are connected;
at least one of the field access devices has a setting element, by which it can be set whether an aggregator apparatus is present in the field bus system to which aggregator apparatus the field access device is connected, or whether no such aggregator apparatus is present and the data exchange takes place directly with at least one host computer;
at least one of the field access devices has a setting element, by which it can be set whether an aggregator apparatus is present in the field bus system to which aggregator apparatus the field access device is connected, or whether no such aggregator apparatus is present and the data exchange takes place directly with at least one host computer, wherein the setting element is a setting element implemented in hardware;

based on the local domain of the field bus system, a name of the aggregator apparatus can be generated by using a prespecified formation rule on the part of the field access devices and can be used for addressing the aggregator apparatus; and based on the local domain of the field bus system, a name of the aggregator apparatus can be generated by using a prespecified formation rule on the part of the field access devices and can be used for addressing the aggregator apparatus, wherein the particular field access device is designed to, for generating the name of the aggregator apparatus, combine a prespecified name component with the local domain of the field bus network to form the name of the aggregator apparatus.

16. The field bus system of claim 9, wherein the field bus system additionally comprises at least one host computer which is connected to the aggregator apparatus via at least one data connection.

17. The field bus system of claim 9, wherein at least one of the following is true:
- device access software is installed in the at least one host computer; and
- the device access software is device access software according to one of the following standards: FDT, FDT2, FDI Device Packages, OPC Unified Architecture.

* * * * *